United States Patent
Agarwal et al.

(10) Patent No.: US 10,067,762 B2
(45) Date of Patent: Sep. 4, 2018

(54) APPARATUSES, METHODS, AND SYSTEMS FOR MEMORY DISAMBIGUATION

(71) Applicant: Intel Corporation, Santa Clara, CA (US)

(72) Inventors: Vikash Agarwal, Austin, TX (US); Christopher D. Bryant, Austin, TX (US); Jonathan D. Combs, Austin, TX (US); Stephen J. Robinson, Austin, TX (US)

(73) Assignee: INTEL CORPORATION, Santa Clara, CA (US)

( * ) Notice: Subject to any disclaimer, the term of this patent is extended or adjusted under 35 U.S.C. 154(b) by 245 days.

(21) Appl. No.: 15/201,218

(22) Filed: Jul. 1, 2016

(65) Prior Publication Data

US 2018/0004522 A1    Jan. 4, 2018

(51) Int. Cl.
*G06F 9/30* (2018.01)

(52) U.S. Cl.
CPC ........ *G06F 9/30043* (2013.01); *G06F 9/3016* (2013.01)

(58) Field of Classification Search
None
See application file for complete search history.

(56) References Cited

U.S. PATENT DOCUMENTS

| | | | |
|---|---|---|---|
| 5,434,987 A | 7/1995 | Abramson et al. | |
| 7,441,107 B2* | 10/2008 | Hammond | G06F 9/3824 712/216 |
| 8,826,257 B2 | 9/2014 | Al-Otoom et al. | |
| 9,256,497 B2 | 2/2016 | Khartikov et al. | |
| 2007/0226470 A1* | 9/2007 | Krimer | G06F 9/3017 712/225 |
| 2007/0288726 A1* | 12/2007 | Luick | G06F 9/3853 712/225 |
| 2013/0298127 A1* | 11/2013 | Meier | G06F 9/3834 718/100 |
| 2013/0326198 A1 | 12/2013 | Meier et al. | |
| 2015/0067305 A1 | 3/2015 | Olson et al. | |
| 2015/0160945 A1 | 6/2015 | Ashcraft et al. | |
| 2015/0309792 A1 | 10/2015 | Meier et al. | |

OTHER PUBLICATIONS

International Search Report and Written Opinion for Application No. PCT/US2017/037542, dated Sep. 12, 2017, 10 pages.

* cited by examiner

*Primary Examiner* — Eric Coleman

(74) *Attorney, Agent, or Firm* — Nicholson De Vos Webster & Elliott LLP

(57) ABSTRACT

Apparatuses, methods, and systems relating to memory disambiguation are described. In one embodiment, a processor includes a decoder to decode an instruction into a decoded instruction, an execution unit to execute the decoded instruction, a retirement unit to retire an executed instruction in program order, and a memory disambiguation circuit to allocate an entry in a memory disambiguation table for a first load instruction that is to be flushed for a memory ordering violation, the entry comprising a counter value and an instruction pointer for the first load instruction.

24 Claims, 16 Drawing Sheets

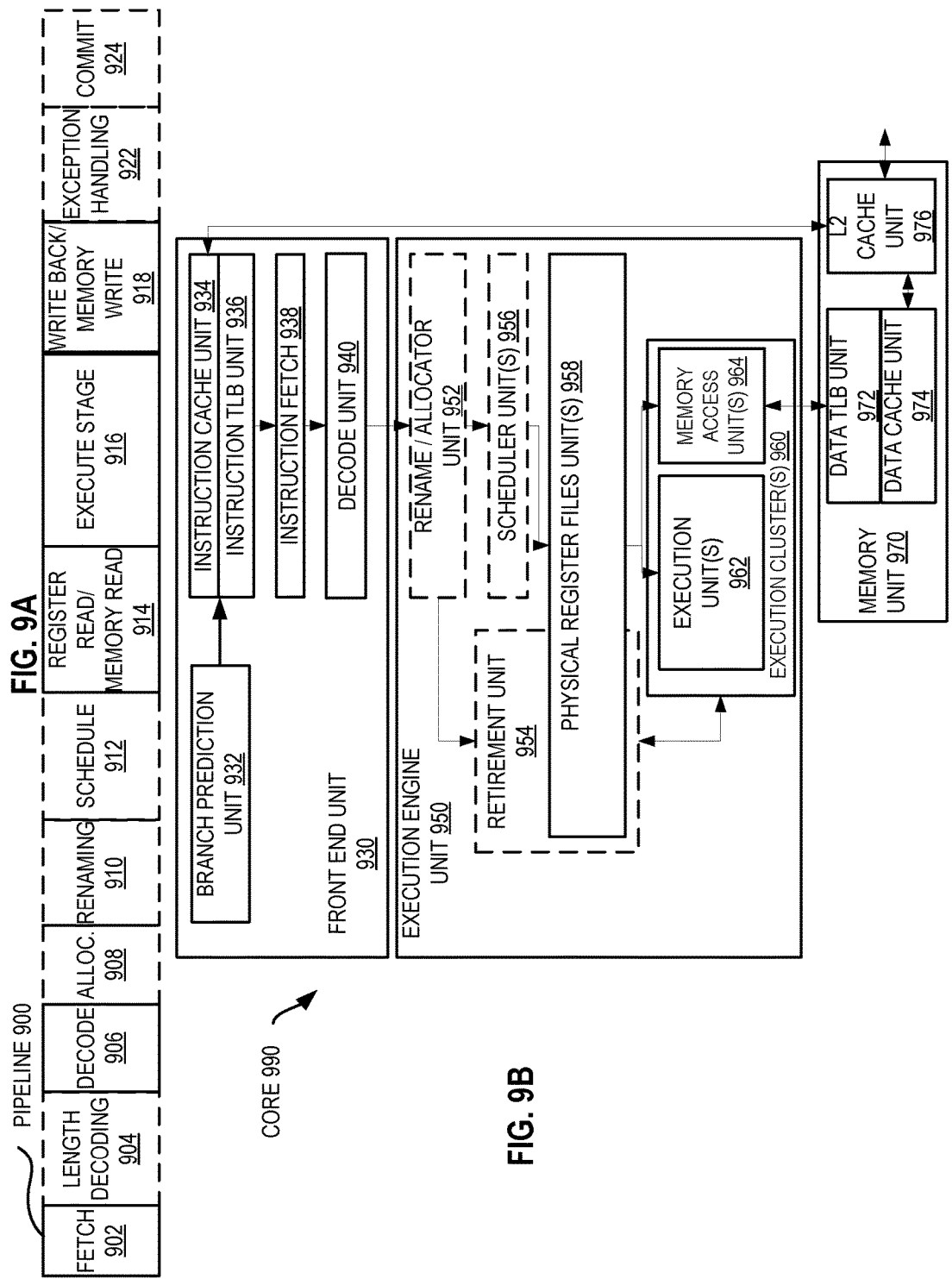

US 10,067,762 B2

APPARATUSES, METHODS, AND SYSTEMS FOR MEMORY DISAMBIGUATION

TECHNICAL FIELD

The disclosure relates generally to electronics, and, more specifically, an embodiment of the disclosure relates to a processor with a hardware memory disambiguation circuit.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 9A is a block diagram illustrating both an exemplary in-order pipeline and an exemplary register renaming, out-of-order issue/execution pipeline according to embodiments of the disclosure.

FIG. 9B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

Figure 1:
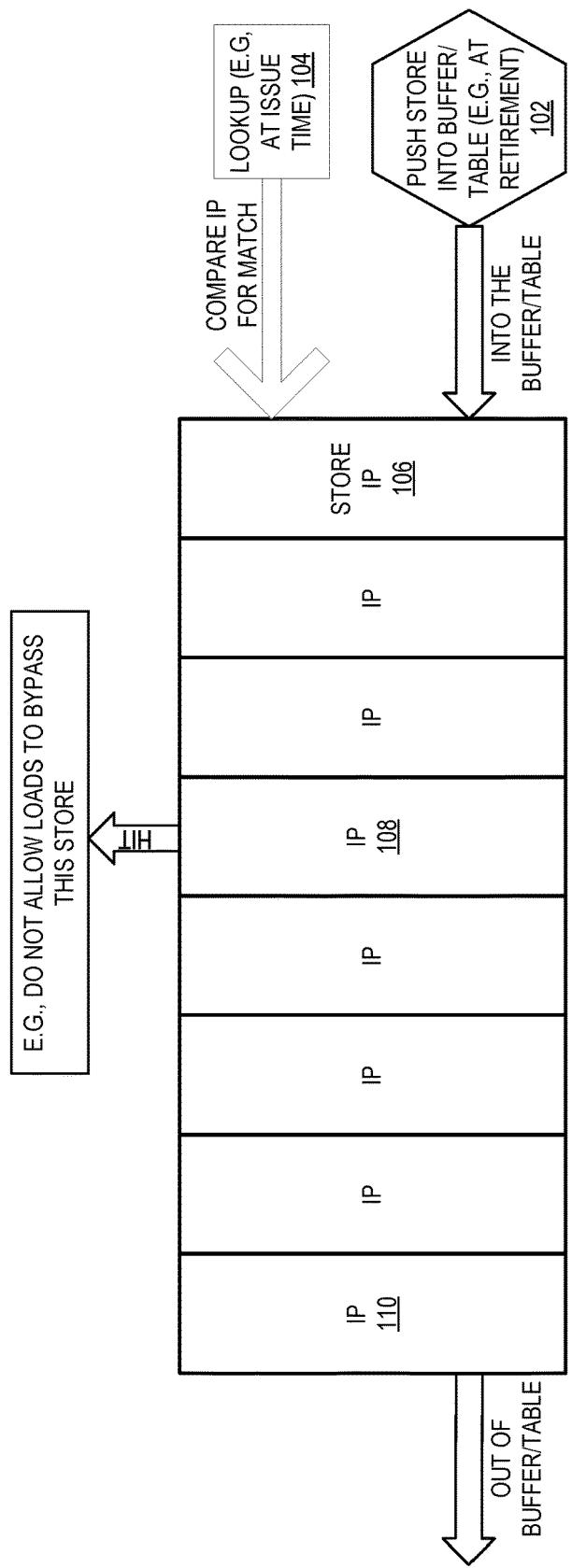
FIG. 1 illustrates a memory disambiguation table (e.g., buffer) for store instructions according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decode unit (decoder) decoding macro-instructions. A processor (e.g., having one or more cores to decode and/or execute instructions) may operate on data, for example, in performing arithmetic, logic, or other functions.

A processor (e.g., processing system) may be based on an out of order (OoO) architecture. An OoO based processor may execute instructions in an order based on the availability of input data rather than by the original order of the instructions as provided by a program. By using such an OoO scheme, the processor may make use of cycles that would otherwise be idle, e.g., while data is retrieved for the next instruction in a program.

Memory disambiguation may generally refer to a technique where younger (e.g., in program order) loads (e.g., load instructions) are allowed to bypass older (e.g., in program order) stores (e.g., store instructions) with minimal impact to performance when the load violates the memory ordering rule. In certain embodiments, this technique allows loads to go out of order with respect to stores and improve processor performance whenever the load was not dependent on any store.

Certain embodiments herein add counters to (e.g., associated with) each entry in a memory disambiguation data structure (e.g., a table or buffer) which tracks the usefulness of the entry. For example, programs change phase and thus the processor may no longer execute the same store and load. Certain embodiments herein (e.g., where a store and load pair of instructions or operations is not relevant) provides a memory disambiguation circuit with a set of rules to remove the less useful (e.g., not relevant) entries in the memory disambiguation data structure while keeping the other (e.g., useful) entries. Certain embodiments herein result in improved performance while maintaining (e.g., or minimizing) the number of pipeline or other data flushes. Certain embodiments herein provide for memory disambiguation with smaller structures, e.g., compared with larger structures, such as, but not limited to, a branch predictor. Certain embodiments herein do not use a branch predictor or prediction. Certain embodiments herein provide for a memory disambiguation circuit for a lower power processor, e.g., taking less power and area. Certain embodiments herein provide for a memory disambiguation circuit with load and/or store filters (e.g., tables and/or buffers). Certain embodiments herein provide for about a 0.9% to 1.7% increase in performance.

FIG. 1 illustrates a memory disambiguation table (e.g., buffer) 100 for store instructions according to embodiments of the disclosure. Although eight entries are depicted in memory disambiguation table (e.g., buffer) 100, any single or plurality of entries may be used. In one embodiment, the number of entries is about 8, 16, or 32. A memory disambiguation circuit may utilize a (e.g., small) memory disambiguation table (e.g., buffer) 100. In one embodiment, it is a memory disambiguation buffer, e.g., a first in, first out (FIFO) buffer. For example, where entry 106 is the newest entry entered into the FIFO and entry 110 is the oldest entry entered into the FIFO. Memory disambiguation table (e.g., buffer) 100 is utilized to track memory ordering violations. In the depicted embodiment, memory disambiguation circuit has entries that correspond to stores (e.g., store instructions or operations) that detect loads that have bypassed an older (e.g., in program order) store. In one embodiment, a memory disambiguation circuit (e.g., and/or a memory management unit) performs a pipeline flush to maintain functional correctness during a memory ordering violation (e.g., where a load bypasses a store and, in program order, that load is to utilize data written by the store), for example, and the instruction or instructions affected by the pipeline flush are re-executed. In one embodiment, a memory disambiguation circuit and/or a memory management unit (e.g., a memory execution cluster) detects a memory violation by having a store (e.g., instruction) that is complete (e.g., from an execution standpoint) compare its ordering information (e.g., address and age information) against load(s). A memory violation signal may thus be propagated to the ROB to cause the ROB to perform an appropriate action (e.g., flush). In one embodiment, a flush is performed by a retirement unit, e.g., a re-order buffer (ROB) circuit thereof. On a flush, some bits (e.g., all, a hashed value, etc.) of that flushed store instruction's instruction pointer (IP) (e.g., next instruction pointer) are added to the memory disambiguation table (e.g., buffer) 100. In one embodiment, the instruction pointer is a 32 bit extended instruction pointer (EIP) or a 64 bit instruction pointer (RIP). In certain embodiments, e.g., to avoid or prevent flushes, the memory disambiguation circuit (e.g., during an instruction allocation phase) is to compare an instruction pointer (or other value that identifies the instruction) for a store (e.g., a store about to be allocated) against the instruction pointers in IPs in the memory disambiguation table (e.g., buffer) 100 to see if there is a match. In certain embodiments, if the store's IP matches an IP in the memory disambiguation table (e.g., buffer) 100, then the memory disambiguation circuit will not allow any younger loads to bypass the store, for example, unless the store which hit in the memory disambiguation table (e.g., buffer) 100 has had its address generated (e.g., assigned), e.g., once a store's address has been generated, a younger load may then be allowed to proceed to retrieve data (e.g., the store's data or other data from the memory and/or cache). In one embodiment, an allocation unit is to allocate the processor resources to an instruction that the instruction will use, for example, register(s) names, (virtual or physical) memory addresses, etc.

A store may be input (e.g., at issue time) and a look up 104 performed by the memory disambiguation circuit to compare the store's IP with the IPs in the memory disambiguation table (e.g., buffer) 100. A match (e.g., hit) may be with entry 108 having the same IP, and thus (e.g., younger) loads may not be allowed to bypass (e.g., in OoO execution) that store. An entry may be allocated 102 (e.g., added or pushed) into memory disambiguation table (e.g., buffer) 100 by the memory disambiguation circuit, e.g., at retirement of that store.

In certain embodiments, such an approach may reduce the number of pipeline flushes, but cause a slowdown of the processor (e.g., central processing unit (CPU)). In certain embodiments, the flow of a program changes and the store and load pair(s) which caused the pipeline flush no longer exists, for example, where a store (e.g., that hit in the memory disambiguation table and caused the serialization, e.g., execution in program order, of all younger loads) no longer exists and thus serialization based on that store is no longer desirable (e.g., necessary), e.g., such that the younger loads could have gone out of order with respect to that store. This (e.g., unnecessary) serialization may keep happening until the store is out (e.g., is pushed out) of the memory disambiguation table (e.g., buffer) 100, for example, the store in the table causing a performance degradation, e.g., by serializing any younger loads to be after a store that matches a store in the memory disambiguation table (e.g., buffer) 100.

Certain embodiments herein provide for a memory disambiguation circuit that avoids and/or minimizes a slowdown of the processor. Certain embodiments herein include a memory disambiguation circuit with a store based filter, and load based filter, and a combination load and store based filter.

Figure 2:
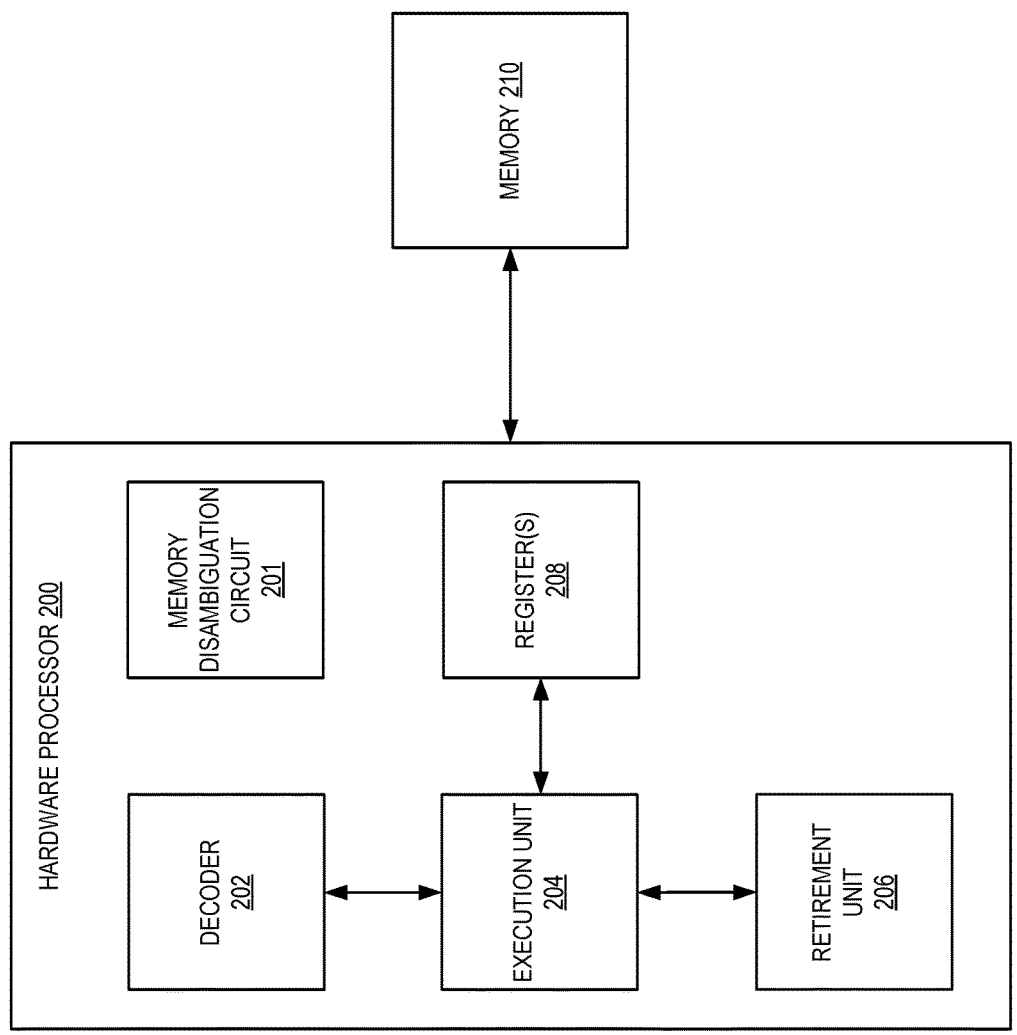
FIG. 2 illustrates a processor according to embodiments of the disclosure.

FIG. 2 illustrates a processor 200 according to embodiments of the disclosure. Processor 200 may include one or more cores. Processor 200, e.g., core or a memory management unit (MMU) (not depicted), may access memory 210. Processor may include one or more components, e.g., discussed below. Hardware decoder 202 may receive an (e.g., single) instruction (e.g., macro-instruction) and decode the instruction, e.g., into micro-instructions and/or micro-operations. Hardware execution unit 204 may execute the decoded instruction (e.g., macro-instruction) to perform an operation or operations. An executed instruction may be retired by the retirement unit 206, e.g., retired in program order. In one embodiment, the effects of the instruction execution are not applied to the architecturally visible state of CPU until that instruction is retired.

Depicted processor 200 includes registers 208, for example, registers to store data to be operated on. Hardware processor may execute instructions (e.g., stored in memory 210) to operate on data, for example, to perform arithmetic, logic, or other functions. A hardware processor may access data in a memory. In one embodiment, a hardware processor is a client requesting access to (e.g., load or store) data and the memory is a server containing the data. In one embodiment, a computer includes a hardware processor requesting access to (e.g., load or store) data and the memory is local to the computer. Memory 210 may be system memory. Memory 210 may store software that executes on the processor 200.

Note that the figures herein may not depict all data communication connections. One of ordinary skill in the art will appreciate that this is to not obscure certain details in the figures. Note that a double headed arrow in the figures may not require two-way communication, for example, it may indicate one-way communication (e.g., to or from that component or device). Any or all combinations of communications paths may be utilized in certain embodiments herein.

Depicted processor 200 includes a memory disambiguation circuit 201. A memory disambiguation circuit (e.g., including hardware logic circuitry) may be a component of a processor (e.g., a memory management unit) or system on a chip (SoC). In certain embodiments, a memory disambiguation circuit is to utilize one or more of the memory disambiguation tables/buffers discussed below, e.g., in FIGS. 3-5.

Figure 3:
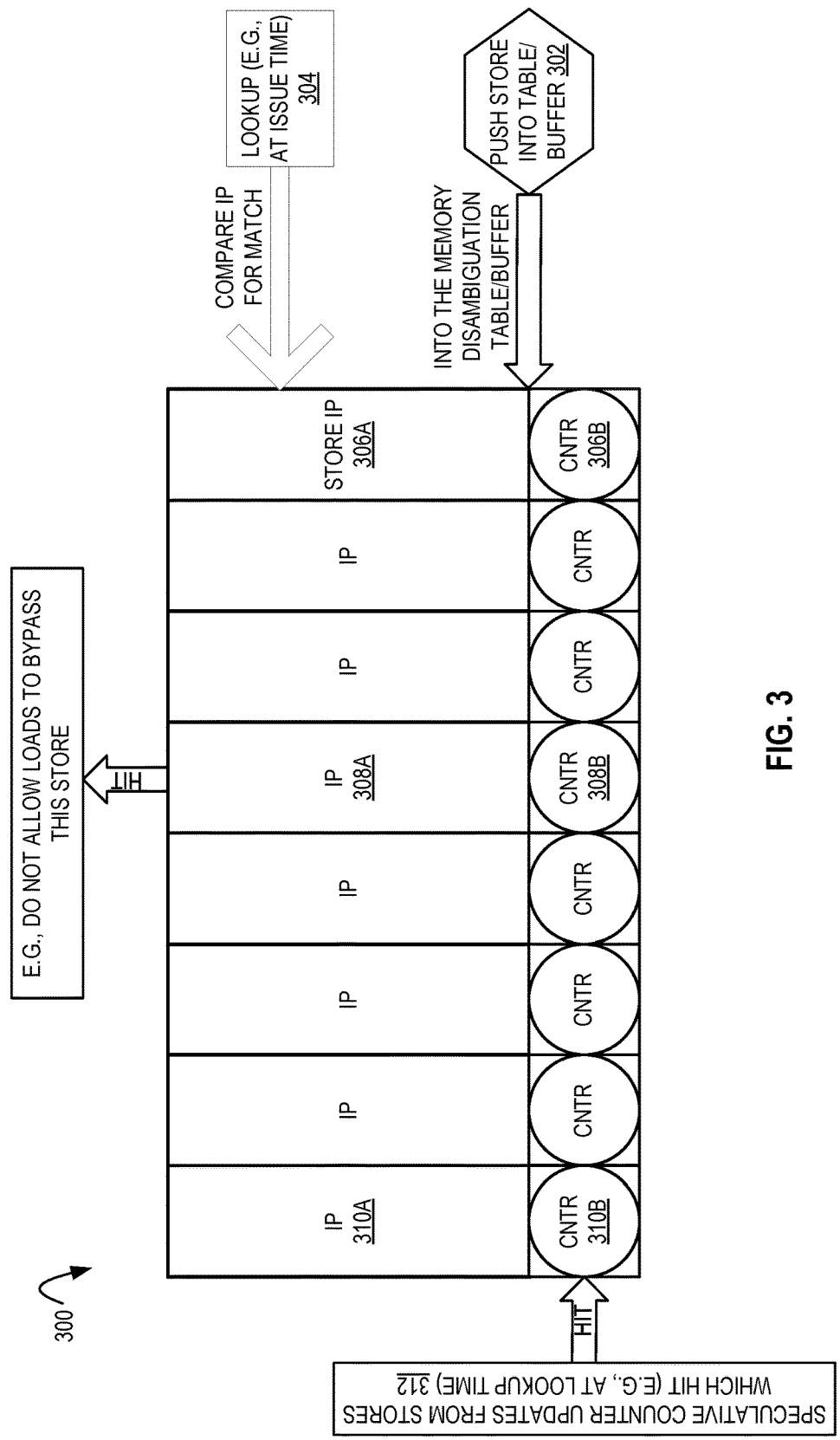
FIG. 3 illustrates a memory disambiguation table (e.g., buffer) for store instructions according to embodiments of the disclosure.

FIG. 3 illustrates a memory disambiguation table (e.g., buffer) 300 for store instructions according to embodiments of the disclosure, e.g., as a store based filter. Certain embodiments herein add counter values to a memory disambiguation table (e.g., buffer). In one embodiment the counter values include one or more possible values of a maximum value (e.g., maximum usefulness of the associated entry), a minimum value (e.g., a minimum threshold), and one or more values therebetween. In one embodiment, an entry is three, four, or more possible values. In one embodiment, a zero is the minimum value (e.g., indicating the associated entry is invalid. In one embodiment, each counter value is two bits, e.g., allowing for four different values (0-3).

A memory disambiguation circuit may detect a new entry (e.g., 306A, 306B) is to be entered into the memory disambiguation table (e.g., buffer) 300 (for example, a store which caused or has the potential to cause a pipeline flush, e.g., from a memory ordering violation). In one embodiment, memory disambiguation circuit inserts 302 the new entry (e.g., 306A, 306B) into the table on or before retirement of the associated store instruction, e.g., including a maximum counter value (e.g., for 2 bit counter the maximum value=3). Each counter for a store instruction that matches (e.g., has an IP that matches) a store instruction currently in the memory disambiguation table (e.g., buffer) 300 may be updated (e.g., speculatively) at or after store operation complete time (e.g., not necessarily store retirement), e.g., in order to save adding more bits to track the counter updates at retirement. In certain embodiments, memory disambiguation table (e.g., buffer) entries of instruction pointers (e.g., 306A, 308A, and 310A) and/or counters (e.g., 306B, 308B, and 310B, respectively) are looked up 304 (e.g., to perform a comparison with an instruction) at allocation time (e.g., before entering into a reservation station). In certain embodiments, memory disambiguation table (e.g., buffer) entries of instruction pointers (e.g., 306A, 308A, and 310A) and/or counters (e.g., 306B, 308B, and 310B, respectively) are looked up 304 when in a reservation station. In certain embodiments, memory disambiguation table (e.g., buffer) entries of instruction pointers (e.g., 306A, 308A, and 310A) and/or counters (e.g., 306B, 308B, and 310B, respectively) are looked up 304 before updating a store buffer, but after scheduling (e.g., after entry into an instruction queue).

In one embodiment, the counter values have the following meaning for each entry: (1) a minimum counter value (e.g., a value of zero) means the entry is invalid, and (2) a counter value greater than the minimum (e.g., greater than zero) means that the store will not allow any younger loads to bypass it, e.g., until that store has been assigned an (e.g., valid) address. In one embodiment, an access address is assigned for the source and/or destination operands (e.g., register names, memory addresses, etc.) for the instruction. In one embodiment, a valid address is an address that does not cause a fault (e.g., a page fault if the address is on an invalid page).

In one embodiment, a memory disambiguation circuit utilizes the following rules for changing 312 a counter value for an existing entry. If (for example at lookup time, e.g., before execution), the store (e.g., instruction or operation) has a match (e.g., an IP match and counter greater than zero) in the memory disambiguation table, a bit may be marked on the store to indicate that this store exists in the filter. In certain embodiments, based on this bit, the updates to the counter are performed at store complete time (e.g., before retirement) based on the following rules: (1) if the store address matches on any younger load's address (e.g., at completion time of the execution), the memory disambiguation circuit is to increment (e.g., by one unit) the counter (e.g., reset the counter to the maximum value), e.g., when a younger load consumes the data from the older store, (2) if no loads are currently in flight (for example, no (e.g., valid) load address (e.g., has been assigned) to compare against) then the counter value does not change (e.g., this case does not harm any load), and (3), if the store address did not match any younger load's address and there were younger loads in flight (e.g., that have an address assigned) to compare against, then decrement the counter (e.g., by one unit).

In one embodiment, a memory disambiguation table is a fully associative cache structure with a circuitry to perform a pseudo least recently used replacement policy (PLRU). For example, with entries having a counter value at the minimum (e.g., the invalid state) replaced (e.g., overwritten by) a new entry (e.g., new IP and counter value) and if no invalid entries are present, then replacing the oldest entry (e.g., entry including 310A, 310B). Certain embodiments help stores which unnecessarily block loads to slowly decay out of the memory disambiguation table and allows younger loads to bypass those older stores. In certain embodiments, this results in considerable performance gains on a variety of benchmarks with no power impact. In one embodiment, replacement of an entry may occur at or immediately after retirement.

In one embodiment, if a counter is already at the maximum value, a next increment will not be performed (e.g., the counter value will stay at the maximum value). In one embodiment, if a counter is already at the minimum value, a next decrement will not be performed (e.g., the counter value will stay at the minimum value).

Figure 4:
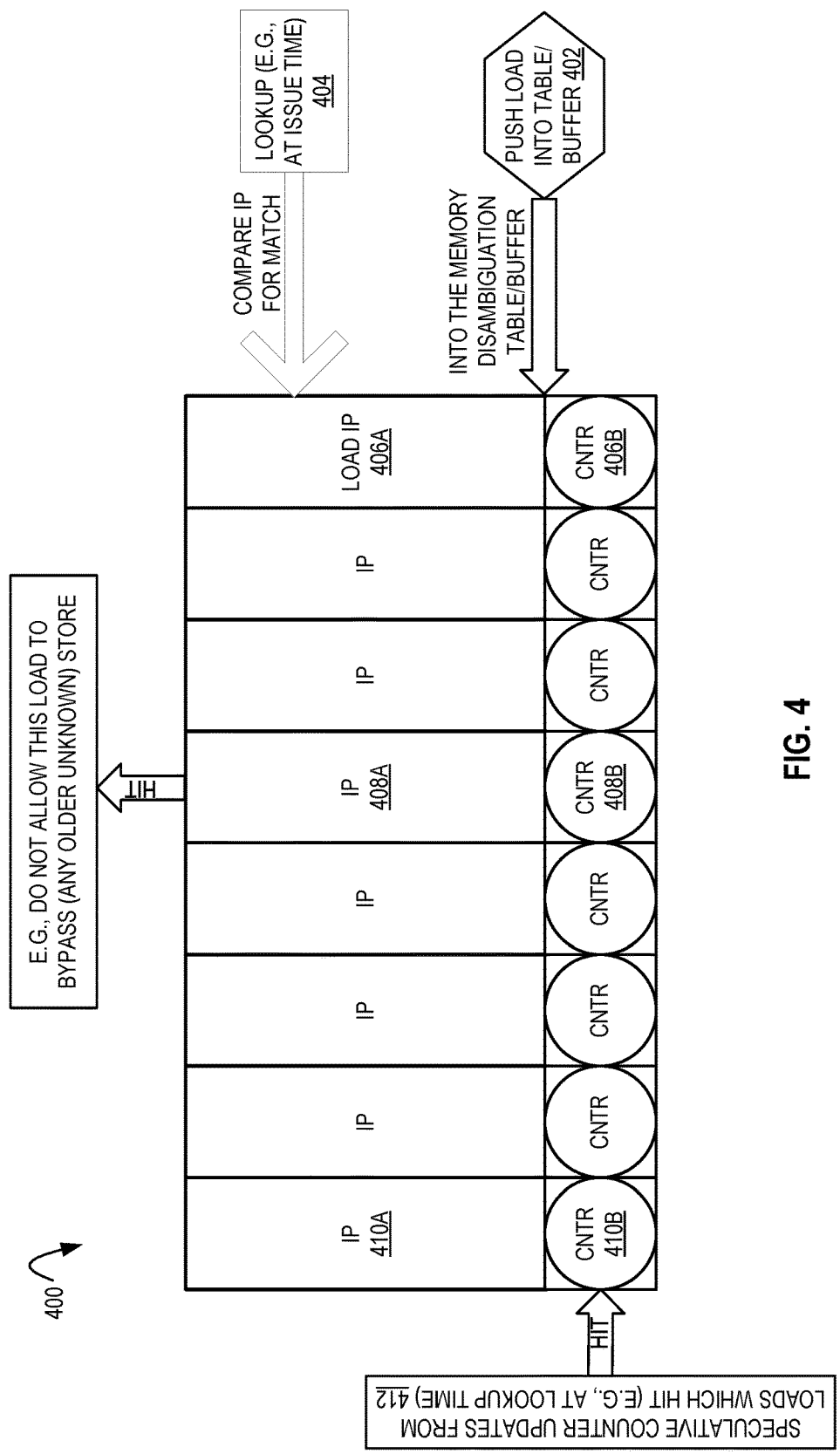
FIG. 4 illustrates a memory disambiguation table (e.g., buffer) for load instructions according to embodiments of the disclosure.

FIG. 4 illustrates a memory disambiguation table (e.g., buffer) 400 for load instructions according to embodiments of the disclosure e.g., as a load based filter. Certain embodiments herein add counter values to a memory disambiguation table (e.g., buffer). In one embodiment the counter values include one or more possible values of a maximum value (e.g., maximum usefulness of the associated entry), a minimum value (e.g., a minimum threshold), and one or more values there between. In one embodiment, an entry is three, four, or more possible values. In one embodiment, a zero is the minimum value (e.g., indicating the associated entry is invalid. In one embodiment, each counter value is two bits, e.g., allowing for four different values (0-3).

A memory disambiguation circuit may detect a new entry (e.g., 406A, 406B) is to be entered into the memory disambiguation table (e.g., buffer) 400 (for example, a load which is flushed, e.g., caused by a memory ordering violation). In one embodiment, memory disambiguation circuit inserts 402 the new entry (e.g., 406A, 406B) into the table on or before retirement of the associated load instruction, e.g., including a maximum counter value (e.g., for 2 bit counter the maximum value=3). Each counter for a load instruction that matches (e.g., has an IP that matches) a load instruction currently in the memory disambiguation table (e.g., buffer) 400 may be updated (e.g., speculatively) after execution of the load (e.g., at load buffer de-allocation time), e.g., in order to save adding more bits to track the counter updates at retirement. In certain embodiments, memory disambiguation table (e.g., buffer) entries of instruction pointers (e.g., 406A, 408A, and 410A) and/or counters (e.g., 406B, 408B, and 410B, respectively) are looked up 404 (e.g., to perform a comparison with an instruction) at load allocation time (e.g., before entering into a reservation station). In certain embodiments, memory disambiguation table (e.g., buffer) entries of instruction pointers (e.g., 406A, 408A, and 410A) and/or counters (e.g., 406B, 408B, and 410B, respectively) are looked up 404 when in a reservation station. In certain embodiments, memory disambiguation table (e.g., buffer) entries of instruction pointers (e.g., 406A, 408A, and 410A) and/or counters (e.g., 406B, 408B, and 410B, respectively) are looked up 404 before updating a load buffer, but after scheduling (e.g., after entry into an instruction queue).

In one embodiment, the counter values have the following meaning for each entry: (1) a minimum counter value (e.g., a value of zero) means the entry is invalid, and (2) a counter value greater than the minimum (e.g., greater than zero) means that the load which hit does not bypass any older store, e.g., that has not been assigned an (e.g., valid) address. In one embodiment, a valid address is an address that does not cause a fault (e.g., a page fault if the address is on an invalid page). In one embodiment, an access address is assigned for the source and/or destination operands (e.g., register names, memory addresses, etc.) for the instruction.

In one embodiment, a memory disambiguation circuit utilizes the following rules for changing 412 a counter value for an existing entry. If (for example at lookup time, e.g., before execution), the load (e.g., instruction or operation) has a match (e.g., an IP match and counter greater than a minimum value) in the memory disambiguation table, a bit may be marked on the load to indicate that this load exists in the filter. In certain embodiments, based on this bit, the updates to the counter are performed at load complete time (e.g., before retirement) based on the following rules: (1) if the load bypassed any older store (e.g., the load had its address generated before any store had its address generated) and the load's address matches an older store's address, then increment (e.g., by one unit) the counter (e.g., reset the counter to the maximum value), (2) if the load did not bypass any older store (e.g., the load had its address generated after all stores had their respective addresses generated or there are no older stores in the memory disambiguation circuit), then no change in counter value, and (3) if the load bypassed any older store (e.g., the load had its address generated before any store had its address generated), and the load's address did not match any older store's address then decrement the counter (e.g., by one unit).

In one embodiment, a memory disambiguation table is a fully associative cache structure with a circuitry to perform a pseudo least recently used replacement policy (PLRU). For example, with entries having a counter value at the minimum (e.g., the invalid state) replaced (e.g., overwritten by) a new entry (e.g., new IP and counter value) and if no invalid entries are present, then replacing the oldest entry (e.g., entry including 410A, 410B). Certain embodiments help loads which unnecessarily get blocked to slowly decay out of the memory disambiguation table and allows younger loads to bypass those older stores. In certain embodiments, this results in considerable performance gains on a variety of benchmarks with no power impact. In one embodiment, replacement of an entry may occur at or immediately after retirement.

In one embodiment, if a counter is already at the maximum value, a next increment will not be performed (e.g., the counter value will stay at the maximum value). In one embodiment, if a counter is already at the minimum value, a next decrement will not be performed (e.g., the counter value will stay at the minimum value).

Figure 5:
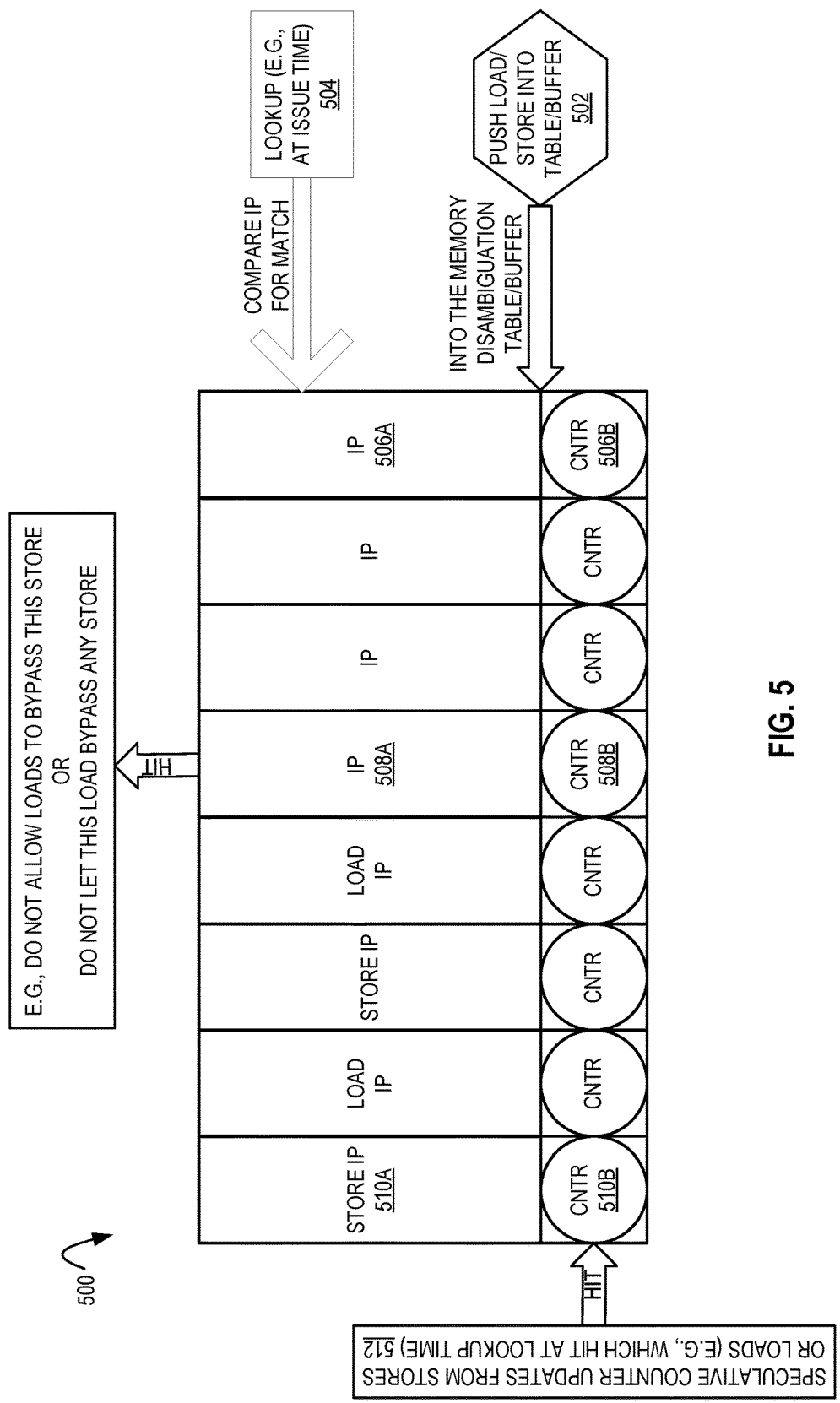
FIG. 5 illustrates a memory disambiguation table (e.g., buffer) for load instructions and store instructions according to embodiments of the disclosure.

FIG. 5 illustrates a memory disambiguation table (e.g., buffer) 500 for load instructions and store instructions according to embodiments of the disclosure, e.g., as a load and store based filter. In certain embodiments, instead of just stores or loads being input into a memory disambiguation table, a memory disambiguation circuit adds both loads and stores to a memory disambiguation table. Certain embodiments herein enable the load and store of a load-op-store (e.g., one of a pair of load and store instructions that utilizes the data of the other of the pair) to be tracked. Certain embodiments herein add counter values to a memory disambiguation table (e.g., buffer). In one embodiment the counter values include one or more possible values of a maximum value (e.g., maximum usefulness of the associated entry), a minimum value (e.g., a minimum threshold), and one or more values there between. In one embodiment, an entry is three, four, or more possible values. In one embodiment, a zero is the minimum value (e.g., indicating the associated entry is invalid. In one embodiment, each counter value is two bits, e.g., allowing for four different values (0-3).

A memory disambiguation circuit may detect a new entry (e.g., 506A, 506B) is to be entered into the memory disambiguation table (e.g., buffer) 500 (for example, a store and/or a load which caused or has the potential to cause a pipeline flush, e.g., from a memory ordering violation). In one embodiment, memory disambiguation circuit inserts 502 the new entry (e.g., 506A, 506B) into the table on or before retirement of the associated instruction, e.g., including a maximum counter value (e.g., for 2 bit counter the maximum value=3). In one embodiment, each counter for an (e.g., load and/or store) instruction that matches (e.g., has an IP that matches) a store instruction currently in the memory disambiguation table (e.g., buffer) 400 may be updated (e.g., speculatively) at or after the load or store operation's complete time (e.g., not necessarily the retirement), e.g., in order to save adding more bits to track the counter updates at retirement. In certain embodiments, memory disambiguation table (e.g., buffer) entries of instruction pointers (e.g., 506A, 508A, and 510A) and/or counters (e.g., 506B, 508B, and 510B, respectively) are looked up 504 (e.g., to perform a comparison with an instruction) at allocation time (e.g., before entering into a reservation station). In certain embodiments, memory disambiguation table (e.g., buffer) entries of instruction pointers (e.g., 506A, 508A, and 510A) and/or counters (e.g., 506B, 508B, and 510B, respectively) are looked up 504 when in a reservation station. In certain embodiments, memory disambiguation table (e.g., buffer) entries of instruction pointers (e.g., 506A, 508A, and 510A) and/or counters (e.g., 506B, 508B, and 510B, respectively) are looked up 504 before updating a respective load or store buffer, but after scheduling (e.g., after entry into an instruction queue).

In one embodiment, the counter values have the following meaning for each entry: (1) a minimum counter value (e.g., a value of zero) means the entry is invalid, and (2) a counter value greater than the minimum (e.g., greater than zero) means the following when the hit is one of (or both of) a load and a store: (i) the store will not allow any younger loads to bypass it, e.g., until that store has been assigned a (e.g., valid) address, and (ii) the load which hit does not bypass any older store, e.g., that has not been assigned an (e.g., valid) address. In one embodiment, an access address is assigned for the source and/or destination operands (e.g., register names, memory addresses, etc.) for the instruction.

In one embodiment, a memory disambiguation circuit utilizes the following rules for changing 512 a counter value for an existing entry.

Store

If (for example at lookup time, e.g., before execution), the store (e.g., instruction or operation) has a match (e.g., an IP match and counter value greater than zero) in the memory disambiguation table, a bit may be marked on the store to indicate that this store exists in the filter. In certain embodiments, based on this bit, the updates to the counter are performed at store complete time (e.g., before retirement) based on the following rules: (1) if the store address matches on any younger load's address (e.g., at completion time of the execution), the memory disambiguation circuit is to increment (e.g., by one unit) the counter (e.g., reset the counter to the maximum value), e.g., when a younger load consumes the data from the older store, (2) if no loads are currently in flight (for example, no (e.g., valid) load address (e.g., has been assigned) to compare against) then the counter value does not change (e.g., this case does not harm any load), and (3), if the store address did not match any younger load's address and there were younger loads in flight (e.g., that have an address assigned) to compare against, then decrement the counter (e.g., by one unit).

Load

If (for example at lookup time, e.g., before execution), the load (e.g., instruction or operation) has a match (e.g., an IP match and counter greater than a minimum value) in the memory disambiguation table, a bit may be marked on the load to indicate that this load exists in the filter. In certain embodiments, based on this bit, the updates to the counter are performed at load complete time (e.g., before retirement) based on the following rules: (1) if the load bypassed any older store (e.g., the load had its address generated after that store(s) had its address generated) and the load's address matches an older store's address, then increment (e.g., by one unit) the counter (e.g., reset the counter to the maximum value), (2) if the load did not bypass any older store (e.g., the load had its address generated after all stores had their respective addresses generated or there are no older stores in the memory disambiguation circuit), then no change in counter value, and (3) if the load bypassed any older store (e.g., the load had its address generated its address before any older store had its address generated), and the load's address did not match any older store's address then decrement the counter (e.g., by one unit).

In one embodiment, a memory disambiguation table is a fully associative cache structure with a circuitry to perform a pseudo least recently used replacement policy (PLRU). For example, with entries having a counter value at the minimum (e.g., the invalid state) replaced (e.g., overwritten by) a new entry (e.g., new IP and counter value) and if no invalid entries are present, then replacing the oldest entry (e.g., entry including 510A, 510B). Certain embodiments help loads and stores which unnecessarily block stores and loads to slowly decay out of the memory disambiguation table, for example, to allow younger loads (e.g., which previously violated the memory ordering rule) to serialize with respect to older stores. In certain embodiments, this results in considerable performance gains on a variety of benchmarks with no power impact. In one embodiment, replacement of an entry may occur at or immediately after retirement.

In one embodiment, if a counter is already at the maximum value, a next increment will not be performed (e.g., the counter value will stay at the maximum value). In one embodiment, if a counter is already at the minimum value, a next decrement will not be performed (e.g., the counter value will stay at the minimum value).

In a first embodiment, a first instruction in program order is a store (ST) to an access address X (e.g., a register or memory address) and a second instruction in program order is a load (LD) from the same access address X. In a first example of OoO execution, the load bypasses the store.

In a second embodiment, a first instruction in program order is a store (ST) to an access address B (e.g., a register or memory address), a second instruction in program order is a load (LD) from the same access address B, a instruction in program order is a load (LD) from an access address B+1, and a fourth instruction in program order is a load (LD) from an access address B+2. In a second example of OoO execution, multiple loads bypass ST(B), LD(B) bypasses ST(B), LD(B+1) bypasses ST(B), and LD(B+2) does not bypass ST(B). For an embodiment of a memory disambiguation circuit that updates a memory disambiguation table for stores, for both of the above example, an entry is allocated in a respective memory disambiguation table for the stores. For an embodiment of a memory disambiguation circuit that updates a memory disambiguation table for loads, for both of the above example, an entry is allocated in a respective memory disambiguation table for the loads. For an embodiment of a memory disambiguation circuit that updates a memory disambiguation table for loads and stores, for example one, an entry is allocated in a respective memory disambiguation table for the load, and for example, two, an entry is allocated in a respective memory disambiguation table for the store. Although load and store entries are shown as alternating, certain embodiments may not be alternating.

Figure 6:
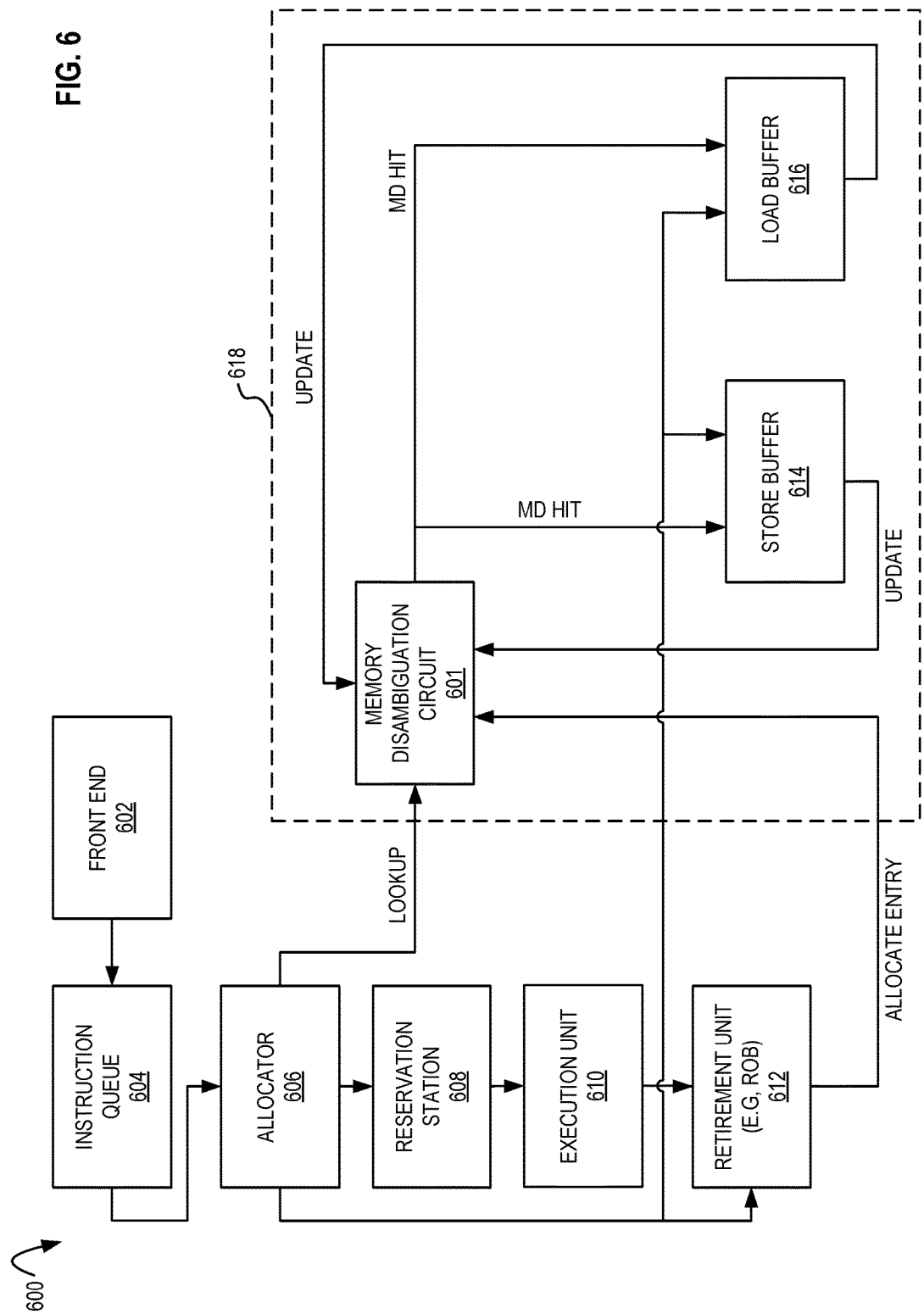
FIG. 6 illustrates a processor according to embodiments of the disclosure.

FIG. 6 illustrates a processor 600 according to embodiments of the disclosure. Processor 600 includes a front end 602, e.g., to fetch and/or decode an instruction. In the depicted embodiment, the decoded instruction then goes to the instruction queue 604 (e.g., until the input operands are available), and then to the allocator 606. Allocator 606 may allocate the processor resources for that instruction (e.g., the register(s) and/or memory address(es)). In the depicted embodiment, at or around the time of allocation a lookup may be performed by memory disambiguation circuit 601 for that instruction in a respective memory disambiguation table (e.g., store buffer 614 or load buffer 616). In another embodiment, the lookup for that instruction may be performed at or around the time the instruction is in the reservation station, e.g., before execution. The decoded instruction may then be executed in the execution unit 610. The executed instruction may then go the retirement unit 612 (e.g., a re-order buffer (ROB) thereof). At retirement, an entry may be allocated in a memory disambiguation table, e.g., as disclosed herein. In one embodiment, the entire memory disambiguation block 618 may be part of a memory management unit (MMU), e.g., separate from a core of a processor. In one embodiment, the reservation station 608 may hold instruction(s) pending resolution of their operands having dependency on the execution results of preceding instruction(s). The instructions may then be dispatched from the reservation station to the appropriate execution units for execution, e.g., as soon as their operands are resolved. In one embodiment, only one of a store buffer 614 and a load buffer 616 is utilized (e.g., is present in a circuit).

Figure 7:
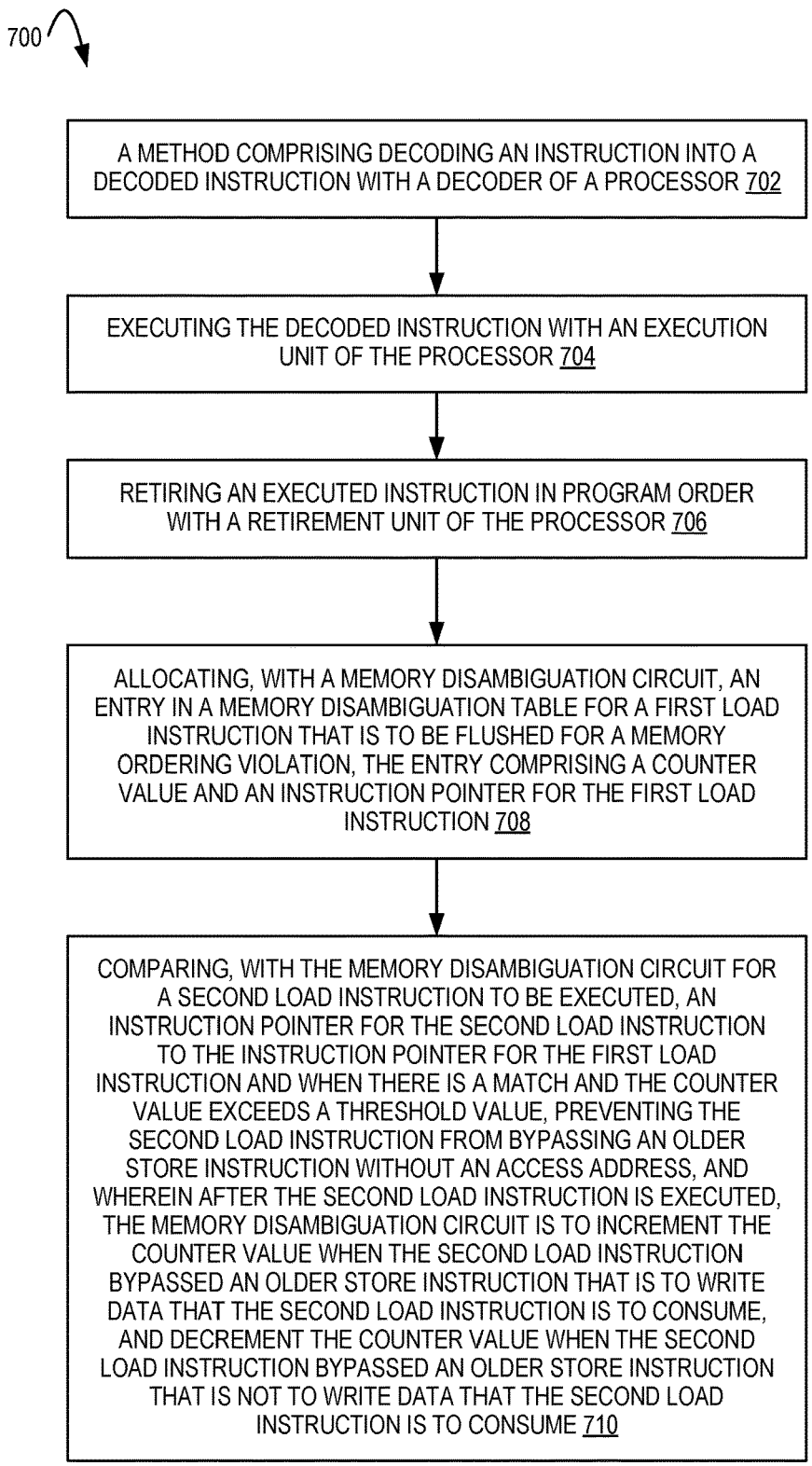
FIG. 7 illustrates a flow diagram according to embodiments of the disclosure.

FIG. 7 illustrates a flow diagram 700 according to embodiments of the disclosure. Flow 700 includes decoding an instruction into a decoded instruction with a decoder of a processor 702, executing the decoded instruction with an execution unit of the processor 704, retiring an executed instruction in program order with a retirement unit of the processor 706, allocating, with a memory disambiguation circuit, an entry in a memory disambiguation table for a first load instruction that is to be flushed for a memory ordering violation, the entry comprising a counter value and an instruction pointer for the first load instruction 708, and comparing, with the memory disambiguation circuit for a second load instruction to be executed, an instruction pointer for the second load instruction to the instruction pointer for the first load instruction and when there is a match and the counter value exceeds a threshold value, preventing the second load instruction from bypassing an older store instruction without an access address, and wherein after the second load instruction is executed, the memory disambiguation circuit is to increment the counter value when the second load instruction bypassed an older store instruction that is to write data that the second load instruction is to consume, and decrement the counter value when the second load instruction bypassed an older store instruction that is not to write data that the second load instruction is to consume 710.

Figure 8:
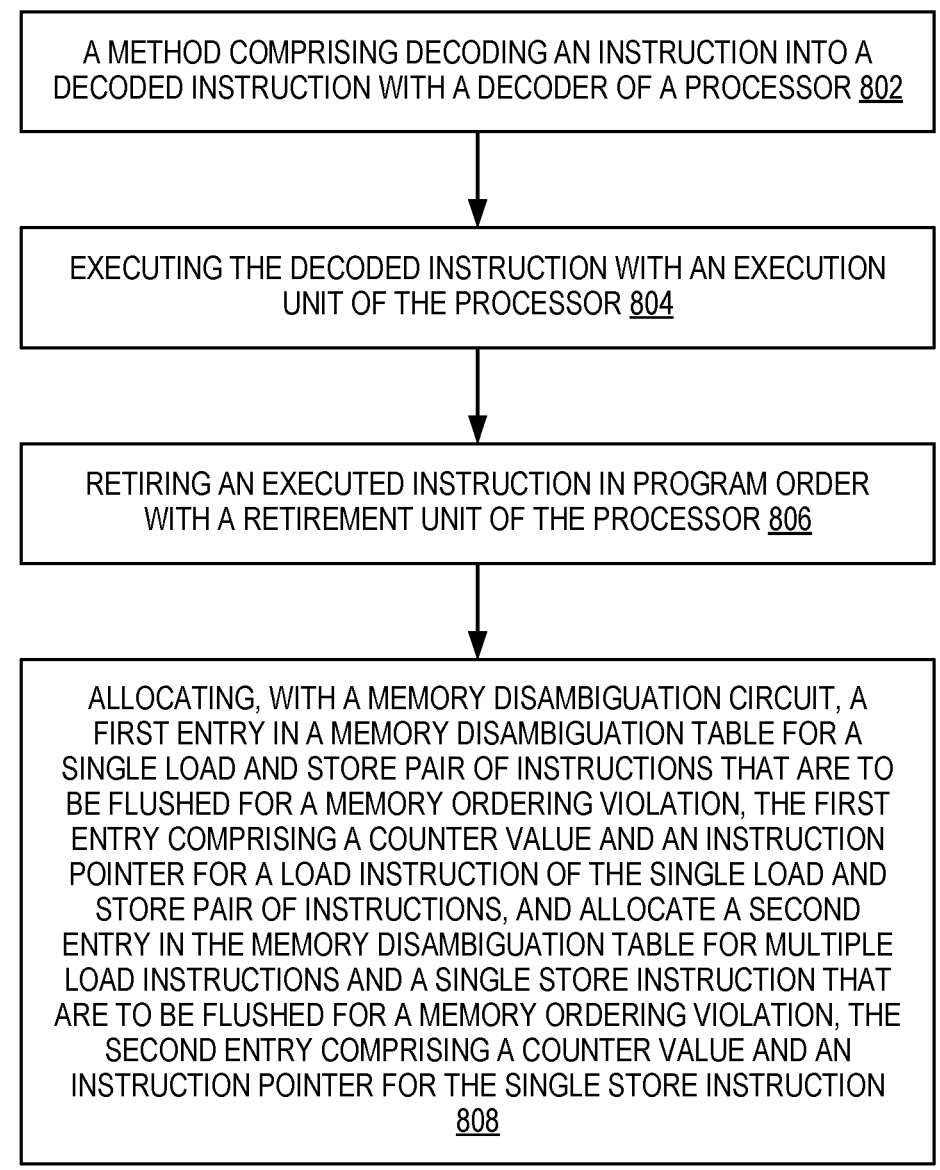
FIG. 8 illustrates a flow diagram according to embodiments of the disclosure.

FIG. 8 illustrates a flow diagram 800 according to embodiments of the disclosure. Flow 800 includes decoding an instruction into a decoded instruction with a decoder of a processor 802, executing the decoded instruction with an execution unit of the processor 804, retiring an executed instruction in program order with a retirement unit of the processor 806, and allocating, with a memory disambiguation circuit, a first entry in a memory disambiguation table for a single load and store pair of instructions that are to be flushed for a memory ordering violation, the first entry comprising a counter value and an instruction pointer for a load instruction of the single load and store pair of instructions, and allocate a second entry in the memory disambiguation table for multiple load instructions and a single store instruction that are to be flushed for a memory ordering violation, the second entry comprising a counter value and an instruction pointer for the single store instruction 808.

In one embodiment, a processor includes a decoder to decode an instruction into a decoded instruction, an execution unit to execute the decoded instruction, a retirement unit to retire an executed instruction in program order, and a memory disambiguation circuit to allocate an entry in a memory disambiguation table for a first load instruction that is to be flushed for a memory ordering violation, the entry comprising a counter value and an instruction pointer for the first load instruction, wherein the memory disambiguation circuit is, for a second load instruction to be executed, to compare an instruction pointer for the second load instruction to the instruction pointer for the first load instruction and when there is a match and the counter value exceeds a threshold value, to prevent the second load instruction from bypassing an older store instruction without an access address, and wherein after the second load instruction is executed, the memory disambiguation circuit is to increment the counter value when the second load instruction bypassed an older store instruction that is to write data that the second load instruction is to consume, and decrement the counter value when the second load instruction bypassed an older store instruction that is not to write data that the second load instruction is to consume. The memory disambiguation circuit may allocate the entry in the memory disambiguation table for the first load instruction at retirement of the first load instruction by the retirement unit. The memory disambiguation circuit may not change the counter value when the second load instruction did not bypass an older store instruction. The memory disambiguation circuit may decrement and increment the counter value after the second load instruction is executed but before the second load instruction is retired by the retirement unit. The memory disambiguation circuit may set a bit on the second load instruction before it is executed to cause a decrement or—an increment of the counter value. The memory disambiguation circuit may set the counter value is to a maximum value when the entry is allocated. In one embodiment, the first load instruction and the second load instruction are the same instruction, for example, executed a first and a second time, respectively, e.g., as in a loop operation.

In another embodiment, a method includes decoding an instruction into a decoded instruction with a decoder of a processor, executing the decoded instruction with an execution unit of the processor, retiring an executed instruction in program order with a retirement unit of the processor, allocating, with a memory disambiguation circuit, an entry in a memory disambiguation table for a first load instruction that is to be flushed for a memory ordering violation, the entry comprising a counter value and an instruction pointer for the first load instruction, and comparing, with the memory disambiguation circuit for a second load instruction to be executed, an instruction pointer for the second load instruction to the instruction pointer for the first load instruction and when there is a match and the counter value exceeds a threshold value, preventing the second load instruction from bypassing an older store instruction without an access address, and wherein after the second load instruction is executed, the memory disambiguation circuit is to increment the counter value when the second load instruction bypassed an older store instruction that is to write data that the second load instruction is to consume, and decrement the counter value when the second load instruction bypassed an older store instruction that is not to write data that the second load instruction is to consume. The allocating may include allocating the entry in the memory disambiguation table for the first load instruction at retirement of the first load instruction by the retirement unit. The method may include not changing the counter value when the second load instruction did not bypass an older store instruction. The method may include decrementing and incrementing the counter value after the second load instruction is executed but before the second load instruction is retired by the retirement unit. The method may include setting a bit on the second load instruction before it is executed to cause a decrement and an increment of the counter value. The method may include setting the counter value to a maximum value when the entry is allocated.

In yet another embodiment, a processor includes a decoder to decode an instruction into a decoded instruction, an execution unit to execute the decoded instruction, a retirement unit to retire an executed instruction in program order, and a memory disambiguation circuit to allocate a first entry in a memory disambiguation table for a single load and store pair of instructions that are to be flushed for a memory ordering violation, the first entry comprising a counter value and an instruction pointer for a load instruction of the single load and store pair of instructions, and allocate a second entry in the memory disambiguation table for multiple load instructions and a single store instruction that are to be flushed for a memory ordering violation, the second entry comprising a counter value and an instruction pointer for the single store instruction. The memory disambiguation circuit may, for an additional instruction to be executed, compare an instruction pointer for the additional instruction to the instruction pointers in the memory disambiguation table and when there is a match and a respective counter value exceeds a threshold value, may prevent younger load instructions without an access address from bypassing a store type of the additional instruction, and may prevent a load type of the additional instruction from bypassing an older store instruction without an access address. The memory disambiguation circuit may, after a load type of an additional instruction is executed, increment a respective counter value when the additional instruction bypassed an older store instruction that is to write data that the additional instruction is to consume, and may decrement the respective counter value when the additional instruction bypassed an older store instruction that is not to write data that the additional instruction is to consume. The memory disambiguation circuit may not change the respective counter value when the additional instruction did not bypass an older store instruction. The memory disambiguation circuit may, after a store type of an additional instruction is executed, increment a respective counter value when a younger load instruction is to consume data written by the additional instruction, and may decrement the respective counter value when all younger load instructions with an access address are not to read data that the additional instruction is to write. The memory disambiguation circuit may not change the respective counter value when there are no load instructions with an access address.

In another embodiment, a method includes decoding an instruction into a decoded instruction with a decoder of a processor, executing the decoded instruction with an execution unit of the processor, retiring an executed instruction in program order with a retirement unit of the processor, and allocating, with a memory disambiguation circuit, a first entry in a memory disambiguation table for a single load and store pair of instructions that are to be flushed for a memory ordering violation, the first entry comprising a counter value and an instruction pointer for a load instruction of the single load and store pair of instructions, and allocate a second entry in the memory disambiguation table for multiple load instructions and a single store instruction that are to be flushed for a memory ordering violation, the second entry comprising a counter value and an instruction pointer for the single store instruction. The method may include comparing an instruction pointer for an additional instruction to the instruction pointers in the memory disambiguation table and when there is a match and a respective counter value exceeds a threshold value, preventing younger load instructions without an access address from bypassing a store type of the additional instruction, and preventing a load type of the additional instruction from bypassing an older store instruction without an access address. The method may include, after a load type of an additional instruction is executed, incrementing a respective counter value when the additional instruction bypassed an older store instruction that is to write data that the additional instruction is to consume, and decrementing the respective counter value when the additional instruction bypassed an older store instruction that is not to write data that the additional instruction is to consume. The method may include not changing the respective counter value when the additional instruction did not bypass an older store instruction. The method may include, after a store type of an additional instruction is executed, incrementing a respective counter value when a younger load instruction is to consume data written by the additional instruction, and decrementing the respective counter value when all younger load instructions with an access address are not to read data that the additional instruction is to write. The method may include not changing the respective counter value when there are no load instructions with an access address.

In yet another embodiment, a processor includes a memory disambiguation circuit to allocate an entry in a memory disambiguation table for a first load instruction that is to be flushed for a memory ordering violation, the entry comprising a counter value and an instruction pointer for the first load instruction, wherein the memory disambiguation circuit is, for a second load instruction to be executed, to compare an instruction pointer for the second load instruction to the instruction pointer for the first load instruction and when there is a match and the counter value exceeds a threshold value, to prevent the second load instruction from bypassing an older store instruction without an access address, and wherein after the second load instruction is executed, the memory disambiguation circuit is to increment the counter value when the second load instruction bypassed an older store instruction that is to write data that the second load instruction is to consume, and decrement the counter value when the second load instruction bypassed an older store instruction that is not to write data that the second load instruction is to consume.

In another embodiment, a processor includes a memory disambiguation circuit to allocate a first entry in a memory disambiguation table for a single load and store pair of instructions that are to be flushed for a memory ordering violation, the first entry comprising a counter value and an instruction pointer for a load instruction of the single load and store pair of instructions, and allocate a second entry in the memory disambiguation table for multiple load instructions and a single store instruction that are to be flushed for a memory ordering violation, the second entry comprising a counter value and an instruction pointer for the single store instruction.

In yet another embodiment, a processor includes means to decode an instruction into a decoded instruction, means to execute the decoded instruction, a retirement unit to retire an executed instruction in program order, and means to allocate an entry in a memory disambiguation table for a first load instruction that is to be flushed for a memory ordering violation, the entry comprising a counter value and an instruction pointer for the first load instruction, wherein the means is, for a second load instruction to be executed, to compare an instruction pointer for the second load instruction to the instruction pointer for the first load instruction and when there is a match and the counter value exceeds a threshold value, to prevent the second load instruction from bypassing an older store instruction without an access address, and wherein after the second load instruction is executed, the means is to increment the counter value when the second load instruction bypassed an older store instruction that is to write data that the second load instruction is to consume, and decrement the counter value when the second load instruction bypassed an older store instruction that is not to write data that the second load instruction is to consume.

In another embodiment, a processor includes means to decode an instruction into a decoded instruction, means to execute the decoded instruction, a retirement unit to retire an executed instruction in program order, and means to allocate a first entry in a memory disambiguation table for a single load and store pair of instructions that are to be flushed for a memory ordering violation, the first entry comprising a counter value and an instruction pointer for a load instruction of the single load and store pair of instructions, and allocate a second entry in the memory disambiguation table for multiple load instructions and a single store instruction that are to be flushed for a memory ordering violation, the second entry comprising a counter value and an instruction pointer for the single store instruction.

In yet another embodiment, an apparatus comprises a data storage device that stores code that when executed by a hardware processor causes the hardware processor to perform any method disclosed herein. An apparatus may be as described in the detailed description. A method may be as described in the detailed description.

In another embodiment, a non-transitory machine readable medium that stores code that when executed by a machine causes the machine to perform a method comprising any method disclosed herein.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, April 2016; and see Intel® Architecture Instruction Set Extensions Programming Reference, February 2016).

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 9A is a block diagram illustrating both an exemplary in-order pipeline and an exemplary register renaming, out-of-order issue/execution pipeline according to embodiments of the disclosure. FIG. 9B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB)

936, which is coupled to an instruction fetch unit 938, which is coupled to a decode unit 940. The decode unit 940 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point—status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 10B:
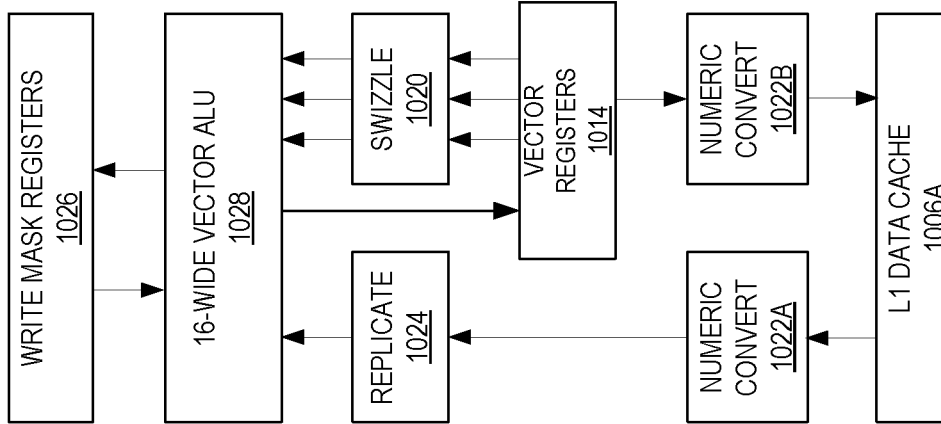
FIG. 10B is an expanded view of part of the processor core in FIG. 10A according to embodiments of the disclosure.
Figure 10A:
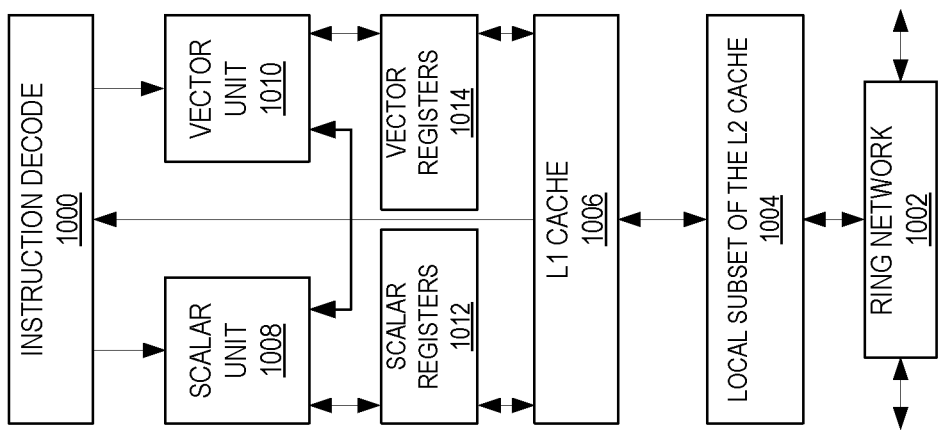
FIG. 10A is a block diagram of a single processor core, along with its connection to the on-die interconnect network and with its local subset of the Level 2 (L2) cache, according to embodiments of the disclosure.

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the disclosure. In one embodiment, an instruction decode unit 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the disclosure may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the disclosure. FIG. 10B includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 11:
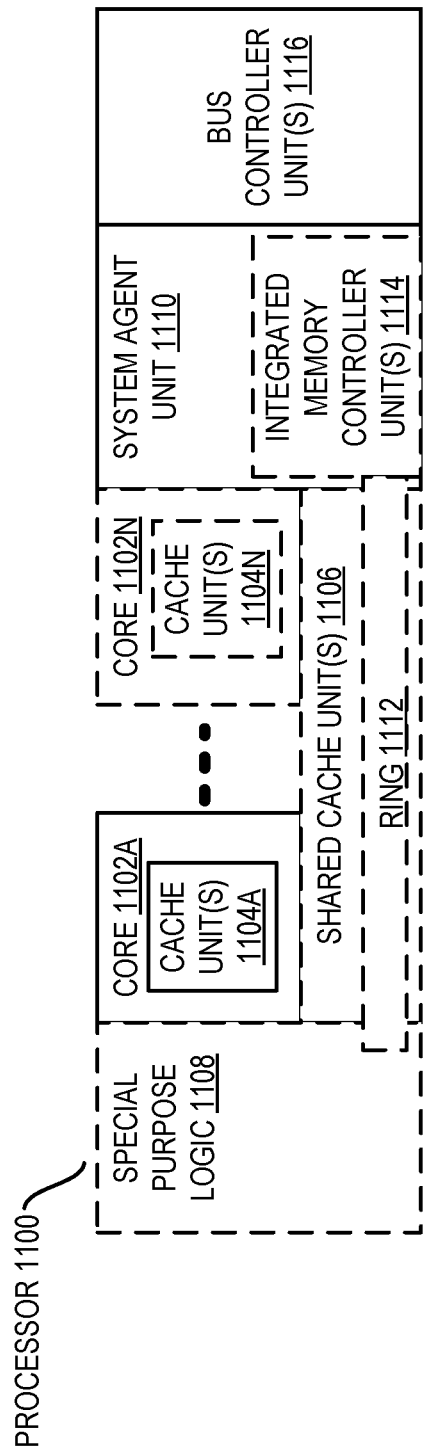
FIG. 11 is a block diagram of a processor that may have more than one core, may have an integrated memory controller, and may have integrated graphics according to embodiments of the disclosure.

FIG. 11 is a block diagram of a processor 1100 that may have more than one core, may have an integrated memory controller, and may have integrated graphics according to embodiments of the disclosure. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
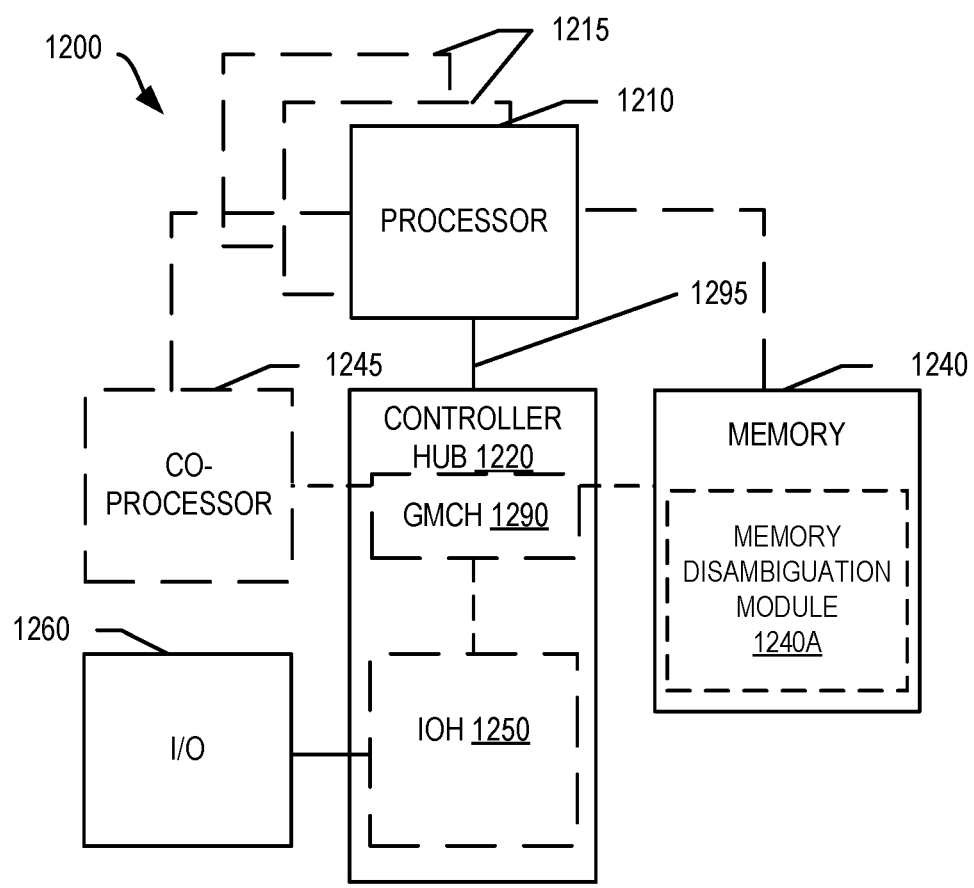
FIG. 12 is a block diagram of a system in accordance with one embodiment of the present disclosure.

Referring now to FIG. 12, shown is a block diagram of a system 1200 in accordance with one embodiment of the present disclosure. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250. Memory 1240 may include a memory disambiguation module 1240A, for example, to store code that when executed causes a processor to perform any method of this disclosure.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
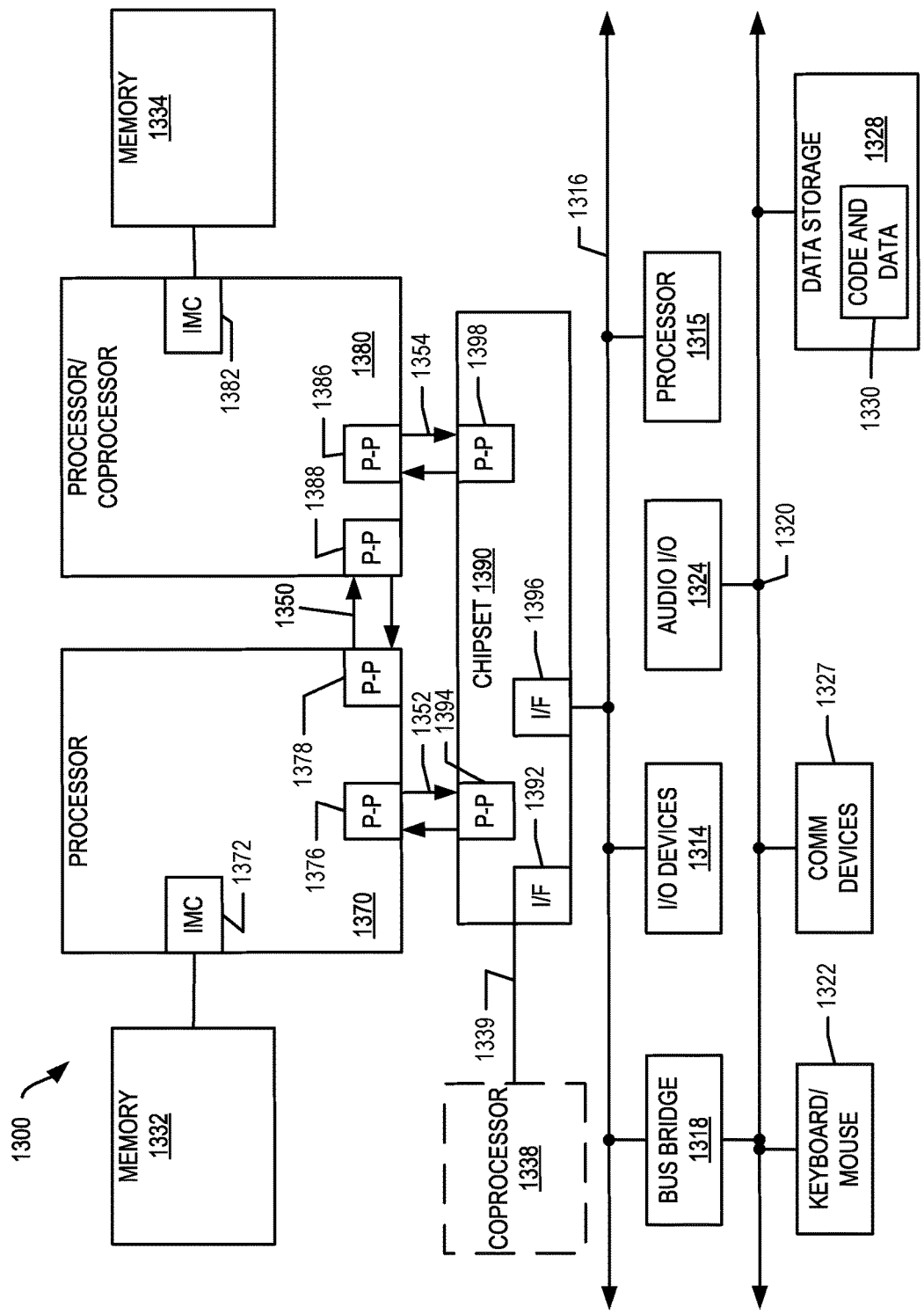
FIG. 13 is a block diagram of a more specific exemplary system in accordance with an embodiment of the present disclosure.

Referring now to FIG. 13, shown is a block diagram of a first more specific exemplary system 1300 in accordance with an embodiment of the present disclosure. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the disclosure, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present disclosure is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
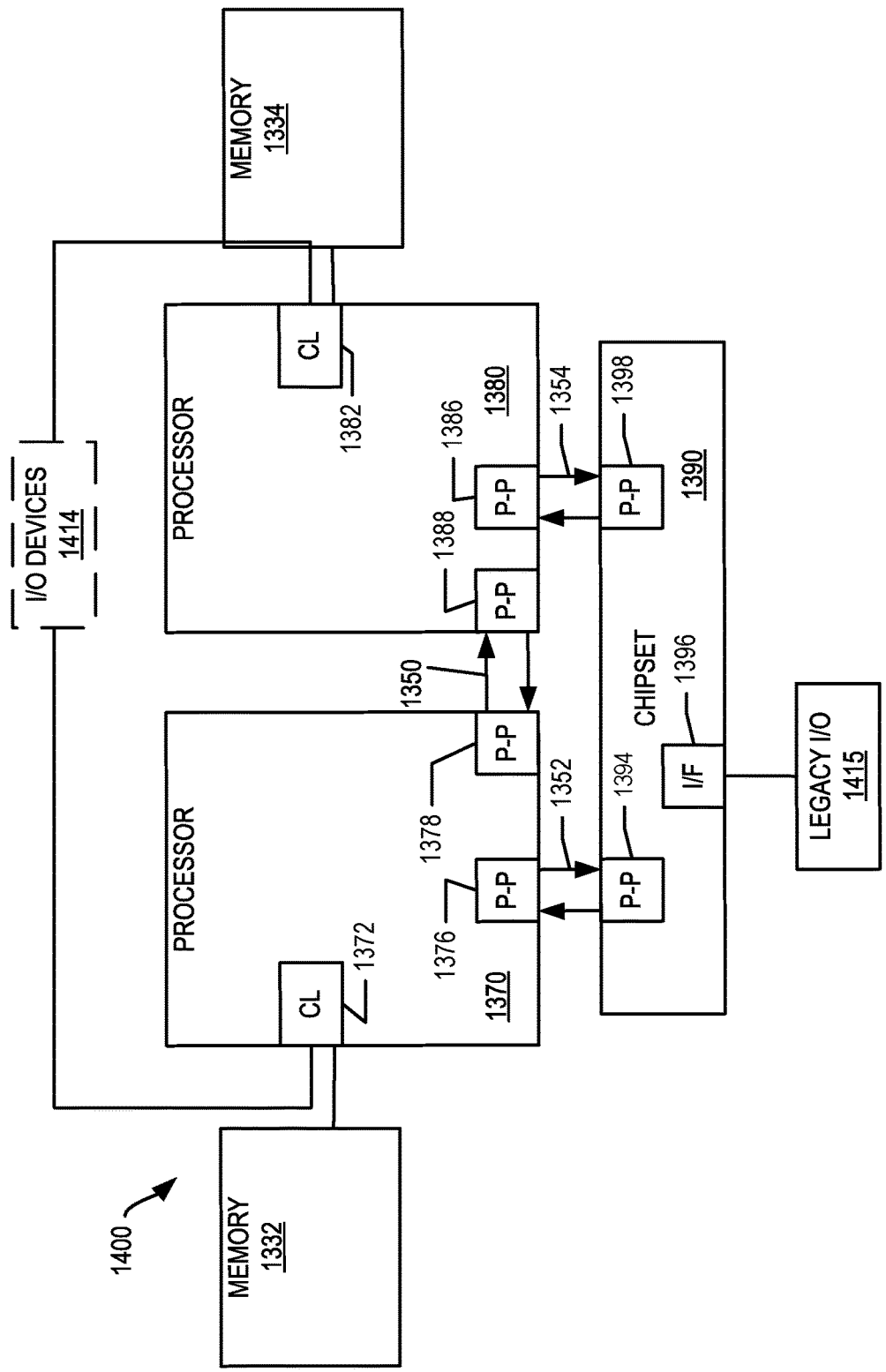
FIG. 14, shown is a block diagram of a second more specific exemplary system in accordance with an embodiment of the present disclosure.

Referring now to FIG. 14, shown is a block diagram of a second more specific exemplary system 1400 in accordance with an embodiment of the present disclosure Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
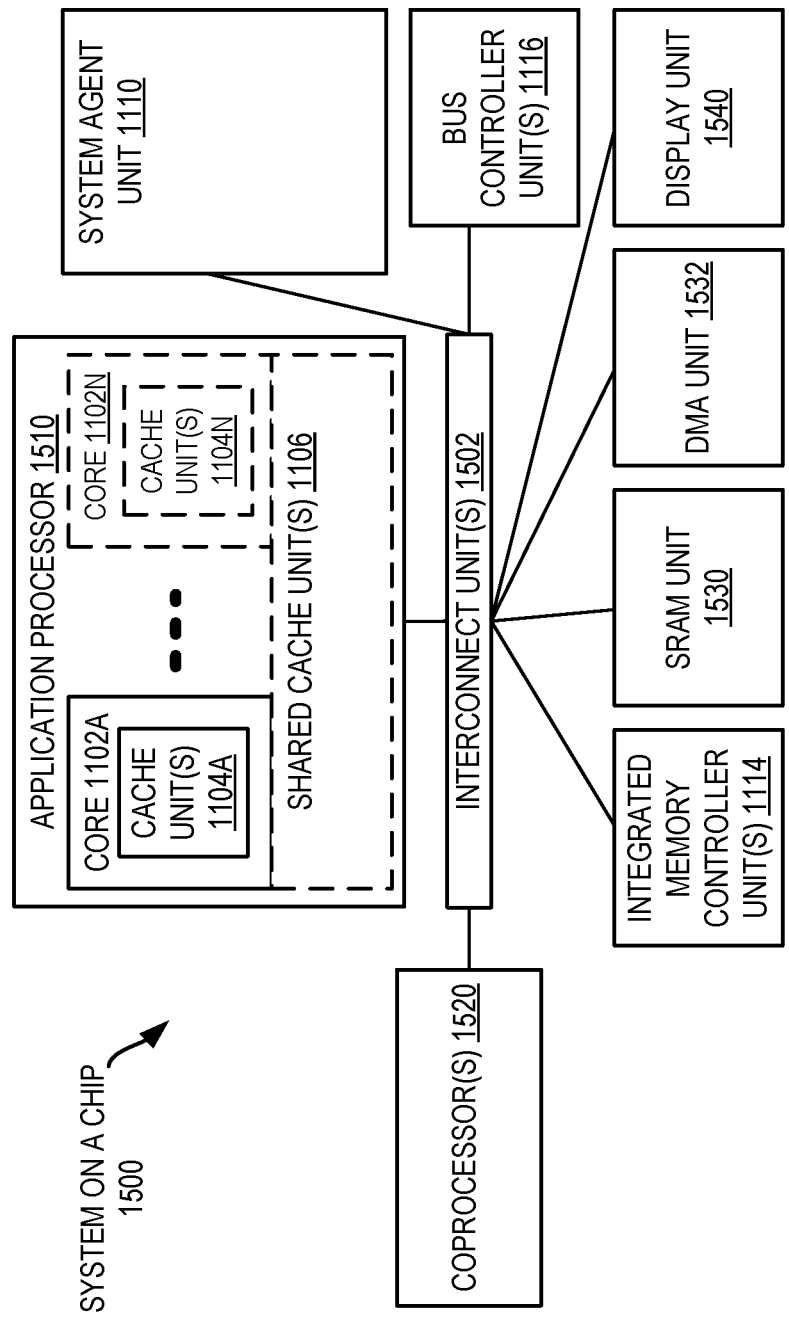
FIG. 15, shown is a block diagram of a system on a chip (SoC) in accordance with an embodiment of the present disclosure.

Referring now to FIG. 15, shown is a block diagram of a SoC 1500 in accordance with an embodiment of the present disclosure. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 202A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 16:
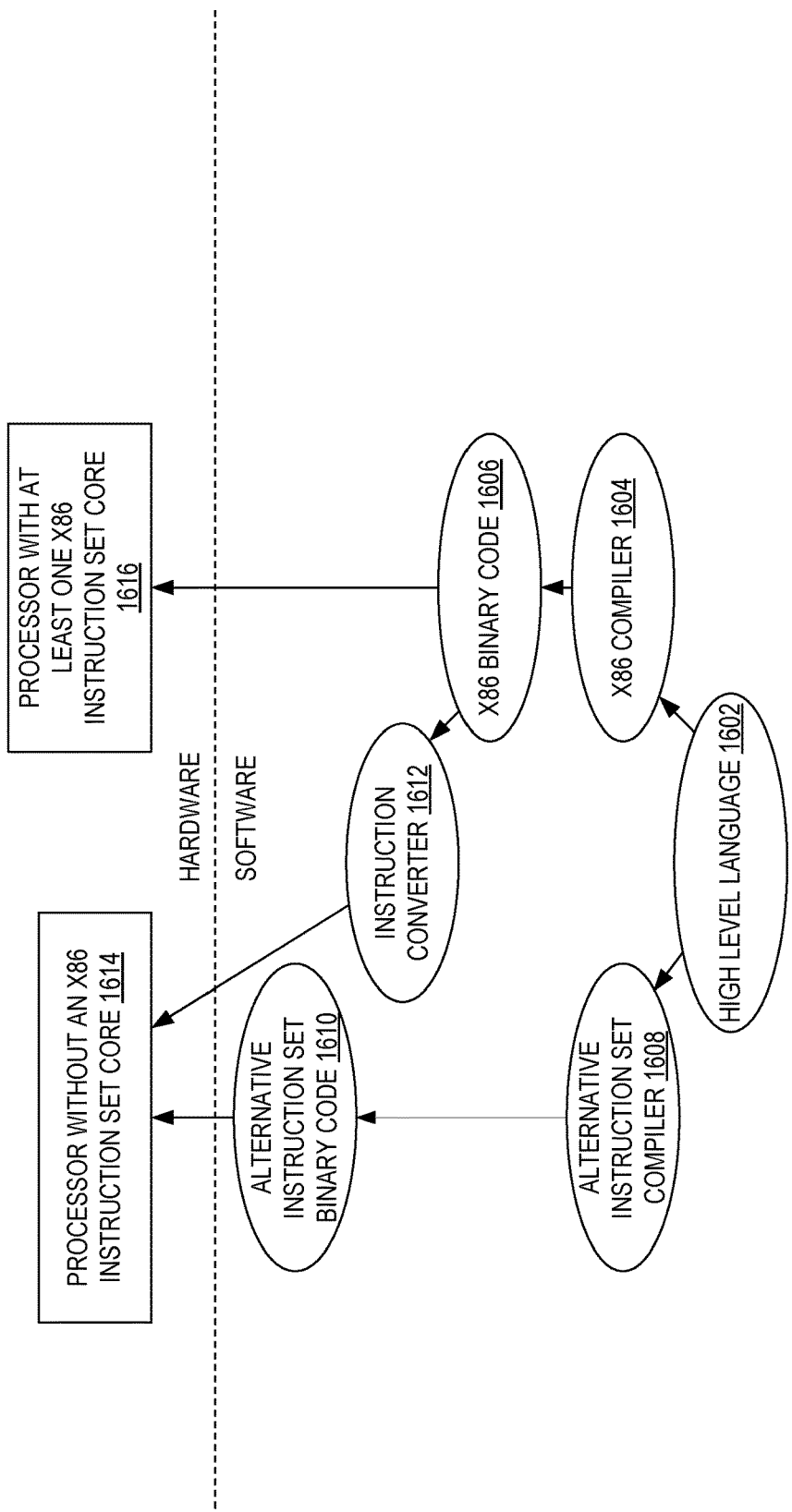
FIG. 16 is a block diagram contrasting the use of a software instruction converter to convert binary instructions in a source instruction set to binary instructions in a target instruction set according to embodiments of the disclosure.

FIG. 16 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

What is claimed is:

1. A processor comprising:
    a decoder to decode an instruction into a decoded instruction;
    an execution unit to execute the decoded instruction;
    a retirement unit to retire an executed instruction in program order; and a memory disambiguation circuit to allocate an entry in a memory disambiguation table for a first load instruction that is to be flushed for a memory ordering violation, the entry comprising a counter value and an instruction pointer for the first load instruction, wherein the memory disambiguation circuit is, for a second load instruction to be executed, to compare an instruction pointer for the second load instruction to the instruction pointer for the first load instruction and when there is a match and the counter value exceeds a threshold value, to prevent the second load instruction from bypassing an older store instruction without an access address, and wherein after the second load instruction is executed, the memory disambiguation circuit is to increment the counter value when the second load instruction bypassed an older store instruction that is to write data that the second load instruction is to consume, and decrement the counter value when the second load instruction bypassed an older store instruction that is not to write data that the second load instruction is to consume.

2. The processor of claim 1, wherein the memory disambiguation circuit is to allocate the entry in the memory disambiguation table for the first load instruction at retirement of the first load instruction by the retirement unit.

3. The processor of claim 1, wherein the memory disambiguation circuit is to not change the counter value when the second load instruction did not bypass an older store instruction.

4. The processor of claim 1, wherein the memory disambiguation circuit is to decrement and increment the counter value after the second load instruction is executed but before the second load instruction is retired by the retirement unit.

5. The processor of claim 1, wherein the memory disambiguation circuit is to set a bit on the second load instruction before it is executed to cause a decrement and an increment of the counter value.

6. The processor of claim 1, wherein the memory disambiguation circuit is to set the counter value to a maximum value when the entry is allocated.

7. A method comprising:
decoding an instruction into a decoded instruction with a decoder of a processor;
executing the decoded instruction with an execution unit of the processor;
retiring an executed instruction in program order with a retirement unit of the processor;
allocating, with a memory disambiguation circuit, an entry in a memory disambiguation table for a first load instruction that is to be flushed for a memory ordering violation, the entry comprising a counter value and an instruction pointer for the first load instruction; and
comparing, with the memory disambiguation circuit for a second load instruction to be executed, an instruction pointer for the second load instruction to the instruction pointer for the first load instruction and when there is a match and the counter value exceeds a threshold value, preventing the second load instruction from bypassing an older store instruction without an access address, and wherein after the second load instruction is executed, the memory disambiguation circuit is to increment the counter value when the second load instruction bypassed an older store instruction that is to write data that the second load instruction is to consume, and decrement the counter value when the second load instruction bypassed an older store instruction that is not to write data that the second load instruction is to consume.

8. The method of claim 7, wherein the allocating comprises allocating the entry in the memory disambiguation table for the first load instruction at retirement of the first load instruction by the retirement unit.

9. The method of claim 7, further comprising not changing the counter value when the second load instruction did not bypass an older store instruction.

10. The method of claim 7, further comprising decrementing and incrementing the counter value after the second load instruction is executed but before the second load instruction is retired by the retirement unit.

11. The method of claim 7, further comprising setting a bit on the second load instruction before it is executed to cause a decrement and an increment of the counter value.

12. The method of claim 7, further comprising setting the counter value to a maximum value when the entry is allocated.

13. A processor comprising:
a decoder to decode an instruction into a decoded instruction;
an execution unit to execute the decoded instruction;
a retirement unit to retire an executed instruction in program order; and
a memory disambiguation circuit to allocate a first entry in a memory disambiguation table for a single load and store pair of instructions that are to be flushed for a memory ordering violation, the first entry comprising a counter value and an instruction pointer for a load instruction of the single load and store pair of instructions, and allocate a second entry in the memory disambiguation table for multiple load instructions and a single store instruction that are to be flushed for a memory ordering violation, the second entry comprising a counter value and an instruction pointer for the single store instruction.

14. The processor of claim 13, wherein the memory disambiguation circuit is, for an additional instruction to be executed, to compare an instruction pointer for the additional instruction to the instruction pointers in the memory disambiguation table and when there is a match and a respective counter value exceeds a threshold value, to prevent younger load instructions without an access address from bypassing a store type of the additional instruction, and prevent a load type of the additional instruction from bypassing an older store instruction without an access address.

15. The processor of claim 13, wherein the memory disambiguation circuit is, after a load type of an additional instruction is executed, to increment a respective counter value when the additional instruction bypassed an older store instruction that is to write data that the additional instruction is to consume, and decrement the respective counter value when the additional instruction bypassed an older store instruction that is not to write data that the additional instruction is to consume.

16. The processor of claim 15, wherein the memory disambiguation circuit is to not change the respective counter value when the additional instruction did not bypass an older store instruction.

17. The processor of claim 13, wherein the memory disambiguation circuit is, after a store type of an additional instruction is executed, to increment a respective counter value when a younger load instruction is to consume data written by the additional instruction, and decrement the respective counter value when all younger load instructions with an access address are not to read data that the additional instruction is to write.

18. The processor of claim 17, wherein the memory disambiguation circuit is to not change the respective counter value when there are no load instructions with an access address.

19. A method comprising:
decoding an instruction into a decoded instruction with a decoder of a processor;
executing the decoded instruction with an execution unit of the processor;
retiring an executed instruction in program order with a retirement unit of the processor; and
allocating, with a memory disambiguation circuit, a first entry in a memory disambiguation table for a single load and store pair of instructions that are to be flushed for a memory ordering violation, the first entry comprising a counter value and an instruction pointer for a load instruction of the single load and store pair of instructions, and allocate a second entry in the memory disambiguation table for multiple load instructions and a single store instruction that are to be flushed for a memory ordering violation, the second entry comprising a counter value and an instruction pointer for the single store instruction.

20. The method of claim 19, further comprising comparing an instruction pointer for an additional instruction to the instruction pointers in the memory disambiguation table and when there is a match and a respective counter value exceeds a threshold value, preventing younger load instructions from bypassing a store type of the additional instruction without an access address, and preventing a load type of the additional instruction from bypassing an older store instruction without an access address.

21. The method of claim 19, further comprising, after a load type of an additional instruction is executed, incrementing a respective counter value when the additional instruction bypassed an older store instruction that is to write data that the additional instruction is to consume, and decrementing the respective counter value when the additional instruction bypassed an older store instruction that is not to write data that the additional instruction is to consume.

22. The method of claim 21, further comprising not changing the respective counter value when the additional instruction did not bypass an older store instruction.

23. The method of claim 19, further comprising, after a store type of an additional instruction is executed, incrementing a respective counter value when a younger load instruction is to consume data written by the additional instruction, and decrementing the respective counter value when all younger load instructions with an access address are not to read data that the additional instruction is to write.

24. The method of claim 23, further comprising not changing the respective counter value when there are no load instructions with an access address.

* * * * *